United States Patent
Low et al.

(10) Patent No.: US 10,041,416 B2
(45) Date of Patent: Aug. 7, 2018

(54) COMBUSTOR SEAL SYSTEM FOR A GAS TURBINE ENGINE

(71) Applicant: United Technologies Corporation, Hartford, CT (US)

(72) Inventors: Kevin Joseph Low, Portland, CT (US); Joey Wong, Enfield, CT (US)

(73) Assignee: United Technologies Corporation, Farmington, CT (US)

( * ) Notice: Subject to any disclaimer, the term of this patent is extended or adjusted under 35 U.S.C. 154(b) by 261 days.

(21) Appl. No.: 14/430,334

(22) PCT Filed: Sep. 30, 2013

(86) PCT No.: PCT/US2013/062542
§ 371 (c)(1),
(2) Date: Mar. 23, 2015

(87) PCT Pub. No.: WO2014/052949
PCT Pub. Date: Apr. 3, 2014

(65) Prior Publication Data
US 2015/0226131 A1 Aug. 13, 2015

Related U.S. Application Data

(60) Provisional application No. 61/707,916, filed on Sep. 29, 2012.

(51) Int. Cl.
*F02C 7/28* (2006.01)
*F01D 9/02* (2006.01)
*F02C 3/107* (2006.01)

(52) U.S. Cl.
CPC .............. *F02C 7/28* (2013.01); *F01D 9/023* (2013.01); *F02C 3/107* (2013.01); *F05D 2240/55* (2013.01); *F23R 2900/00012* (2013.01); *Y10T 29/4932* (2015.01)

(58) Field of Classification Search
CPC .. F02C 7/28; F02C 3/107; F01D 9/023; F01D 11/00; F01D 11/02; Y10T 29/4932; F05D 2240/55; F23R 2900/00012
USPC ......... 60/796; 415/173.1, 173.5, 174.5, 230; 277/412, 418, 419
See application file for complete search history.

(56) References Cited

U.S. PATENT DOCUMENTS

| | | | |
|---|---|---|---|
| 4,274,805 A | 6/1981 | Holmes | |
| 5,265,412 A * | 11/1993 | Bagepalli | F01D 9/023 277/355 |
| 5,289,677 A * | 3/1994 | Jarrell | F23R 3/60 60/752 |

(Continued)

FOREIGN PATENT DOCUMENTS

EP 0867599 A2 9/1998

OTHER PUBLICATIONS

International Search Report and Written Opinion, dated Dec. 23, 2013, for PCT Application No. PCT/US2013/062542, 13 pages.

*Primary Examiner* — Jason T Newton
(74) *Attorney, Agent, or Firm* — Kinney & Lange, P.A.

(57) ABSTRACT

A system for providing a seal between a combustor and a turbine vane. The system includes a flange configured to extend radially from the combustor, and a seal. The flange includes a flange surface configured to face in an axial direction toward a surface of the vane. The seal is configured to be axially loaded between the flange surface and the surface of the vane.

18 Claims, 3 Drawing Sheets

(56) References Cited

U.S. PATENT DOCUMENTS

| | | | |
|---|---|---|---|
| 5,407,319 A | 4/1995 | Harrogate et al. | |
| 5,480,162 A * | 1/1996 | Beeman, Jr. | F01D 9/023 |
| | | | 277/355 |
| 5,785,492 A * | 7/1998 | Belsom | F01D 25/246 |
| | | | 415/173.1 |
| 6,199,871 B1 | 3/2001 | Lampes | |
| 6,418,727 B1 | 7/2002 | Rice et al. | |
| 6,622,490 B2 * | 9/2003 | Ingistov | F01D 11/001 |
| | | | 277/355 |
| 6,658,853 B2 * | 12/2003 | Matsuda | F01D 9/023 |
| | | | 60/753 |
| 6,810,673 B2 | 11/2004 | Snyder | |
| 6,895,757 B2 * | 5/2005 | Mitchell | F01D 11/005 |
| | | | 60/753 |
| 2006/0127219 A1 * | 6/2006 | Zborovsky | F01D 9/023 |
| | | | 415/229 |
| 2010/0237571 A1 * | 9/2010 | Durocher | F16J 15/0887 |
| | | | 277/631 |
| 2010/0307166 A1 * | 12/2010 | Woodcock | F01D 9/023 |
| | | | 60/796 |
| 2015/0240724 A1 * | 8/2015 | Low | F01D 9/023 |
| | | | 60/722 |

* cited by examiner

COMBUSTOR SEAL SYSTEM FOR A GAS TURBINE ENGINE

BACKGROUND

The present invention relates to a turbine engine. In particular, the invention relates to a combustor seal system for a gas turbine engine.

A turbine engine ignites compressed air and fuel in a combustion chamber, or combustor, to create a flow of hot combustion gases to drive multiple stages of turbine blades. The turbine blades extract energy from the flow of hot combustion gases to drive a rotor. The turbine rotor drives a fan to provide thrust and drives a compressor to provide a flow of compressed air. Vanes ahead of, and interspersed between, the multiple stages of turbine blades align the flow of hot combustion gases for an efficient attack angle on the turbine blades.

In most instances, a portion of the flow of compressed air flows around the combustor to cool the combustor and to cool components downstream from the combustor. Leakage of the compressed air into the flow of combustion gases may deprive the downstream components of the cooling necessary to prolong their service life. The loss of compressed air into the flow of combustion gases may also lead to increased compressed air requirements. Energy expended on compressing air that leaks into the flow of combustion gases is not available to produce thrust and engine efficiency is reduced.

Seals are generally employed between components to prevent leakage of the compressed air into the flow of combustion gases. Improvements in the effectiveness of such seals can reduce leakage of compressed air into the flow of combustion gases, and improve the overall efficiency of the turbine engine.

SUMMARY

An embodiment of the present invention is a system for providing a seal between a combustor and a turbine vane. The system includes a flange configured to extend radially from the combustor, and a seal. The flange includes a flange surface configured to face in an axial direction toward a surface of the vane. The seal is configured to be axially loaded between the flange surface and the surface of the vane.

Another embodiment is a gas turbine engine including a combustor, a turbine vane downstream of the combustor, and a combustor seal. The combustor includes a radially extended flange near a downstream end of the combustor. The flange includes a flange surface facing in a downstream axial direction. The turbine vane includes a vane surface facing in an upstream axial direction opposite the flange surface. The combustor seal is axially loaded against the flange surface and the vane surface to seal a gap defined between the combustor and the turbine vane.

Another embodiment is a method of sealing between an annular combustor and a turbine vane. The method includes positioning a combustor seal between a flange surface of the combustor and a vane surface of the turbine vane. The method further includes assembling an outer casing radially outward from the combustor, an inner casing radially inward from the combustor, an inner support connecting the combustor to the inner casing, and an outer support connecting the turbine vane to the outer casing with the combustor seal to provide axial loading on the combustor seal.

DETAILED DESCRIPTION

This application claims the benefit of U.S. Provisional Application No. 61/707,916 filed Sep. 29, 2012, and incorporated herein by reference. In accordance with the present disclosure, an axially loaded combustor seal is provided which can improve the efficiency of a gas turbine engine. The axially loaded combustor seal reduces the compressed air leaking into the flow of combustion gases. The axial load urges sealing surfaces of the combustor seal, combustor, and vane together without a need for springs or other mechanisms which may fail. Additional retention devices are also eliminated as the axial load holds the combustor seal in position. Eliminating such devices improves the reliability of the combustor seal and simplifies assembly and maintenance of the gas turbine engine.

Figure 1:
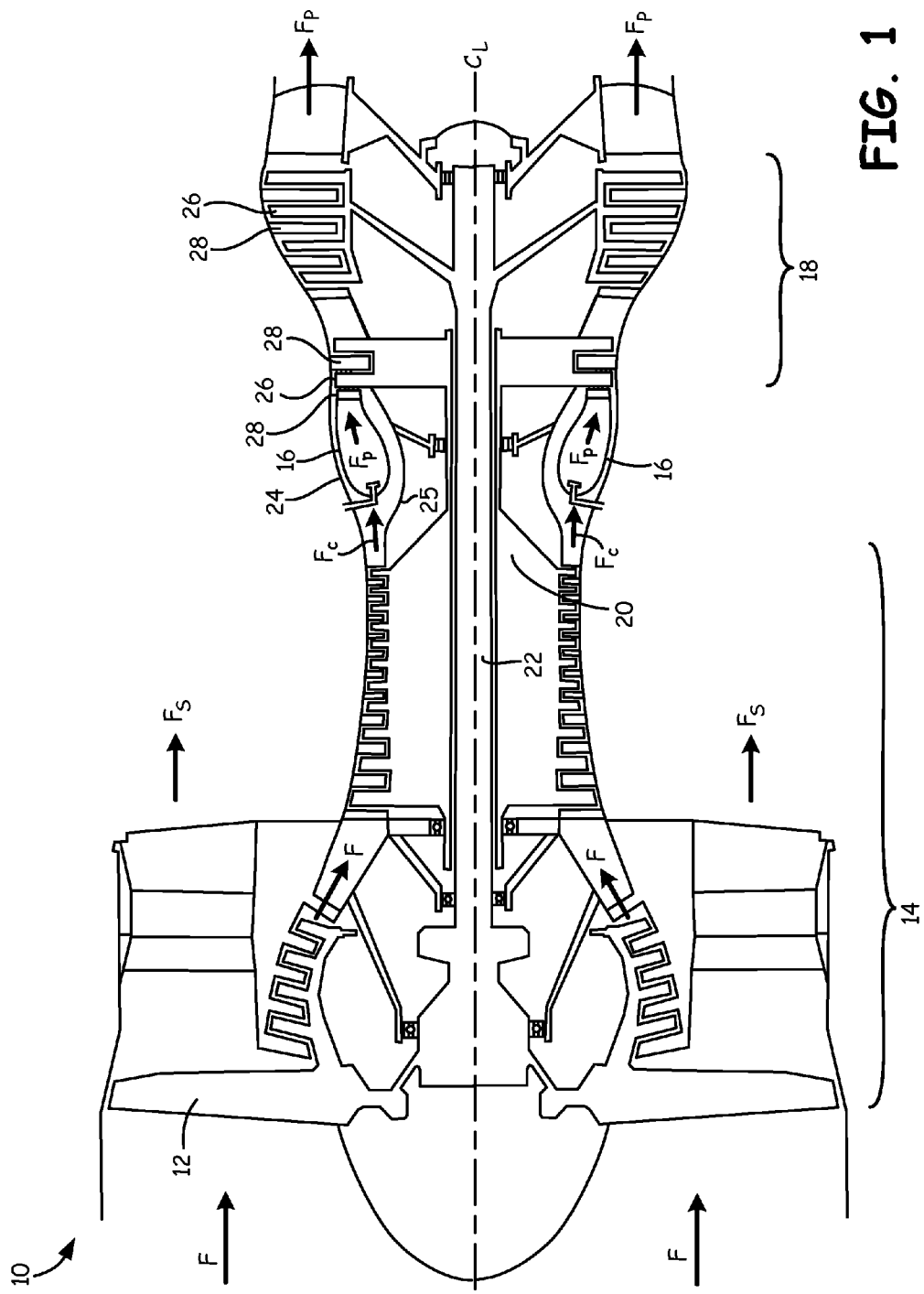
FIG. 1 is a sectional view of a gas turbine engine.

FIG. 1 is a representative illustration of a gas turbine engine. The view in FIG. 1 is a longitudinal sectional view along an engine center line. FIG. 1 shows gas turbine engine 10 including fan 12, compressor 14, combustor 16, turbine 18, high-pressure rotor 20, low-pressure rotor 22, outer casing 24, and inner casing 25. Turbine 18 includes blades 26 and vanes 28.

As illustrated in FIG. 1, fan 12 is positioned along engine center line $C_L$ at one end of gas turbine engine 10. Compressor 14 is adjacent fan 12 along engine center line $C_L$, followed by combustor 16. Combustor 16 is an annular structure that extends circumferentially around engine center line $C_L$. Turbine 18 is located adjacent combustor 16, opposite compressor 14. High-pressure rotor 20 and low-pressure rotor 22 are mounted for rotation about engine center line $C_L$. High-pressure rotor 20 connects a high-pressure section of turbine 18 to compressor 14. Low-pressure rotor 22 connects a low-pressure section of turbine 18 to fan 12. Blades 26 and vanes 28 are arranged throughout turbine 18 in alternating rows. Blades 26 connect to high-pressure rotor 20 and low-pressure rotor 22. Outer casing 24 surrounds turbine engine 10 providing structural support for compressor 14, and turbine 18, as well as containment for a flow of cooling air Fc. Inner casing 25 is generally radially inward from combustor 16 providing structural support for combustor 16 as well as containment for the flow of cooling air Fc.

In operation, air flow F enters compressor 14 through fan 12. Air flow F is compressed by the rotation of compressor 14 driven by high-pressure rotor 20 producing a flow of cooling air Fc. Cooling air Fc flows between combustor 16 and each of outer casing 24 and inner casing 25. A portion of cooling air Fc enters combustor 16, with the remaining portion of cooling air Fc employed farther downstream for cooling other components exposed to high-temperature combustion gases, such as blades 26 and vanes 28. Compressed air and fuel are mixed and ignited in combustor 16 to produce high-temperature, high-pressure combustion gases Fp. Combustion gases Fp exit combustor 16 into turbine section 18. Vanes 28 properly align the flow of combustion gases Fp for an efficient attack angle on subsequent blades 26. The flow of combustion gases Fp past blades 26 drives rotation of both high-pressure rotor 20 and low-pressure rotor 22. High-pressure rotor 20 drives a high-pressure portion of compressor 14, as noted above, and low-pressure rotor 22 drives fan 12 to produce thrust Fs from gas turbine engine 10. Although embodiments of the present invention are illustrated for a turbofan gas turbine engine for aviation use, it is understood that the present invention applies to other aviation gas turbine engines and to industrial gas turbine engines as well.

Figure 2:
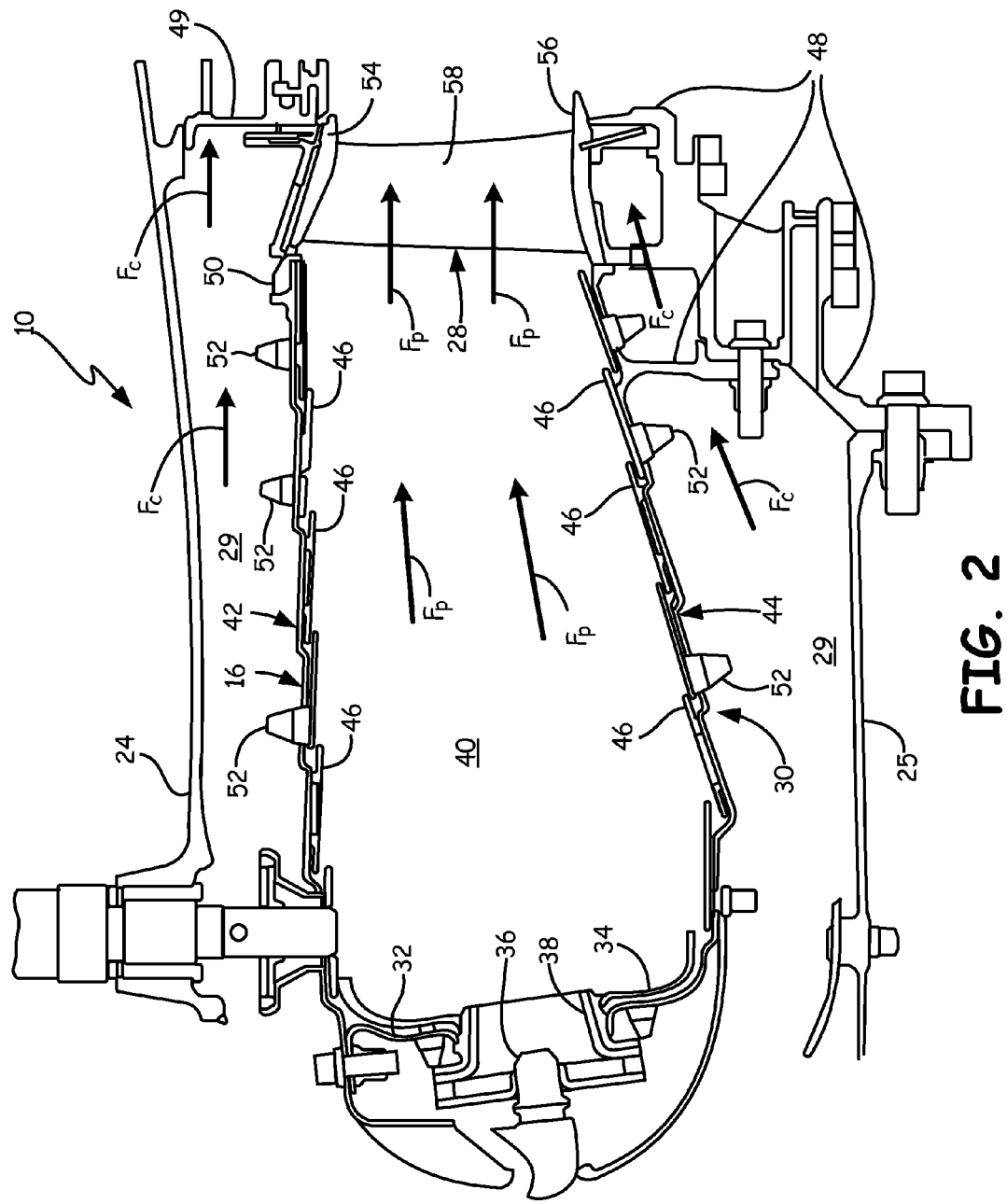
FIG. 2 is an enlarged sectional view of a portion of the gas turbine engine of FIG. 1 embodying the present invention.

FIG. 2 is an enlarged sectional view of a portion of the gas turbine engine 10 of FIG. 1 embodying the present invention. FIG. 2 illustrates combustor 16, outer casing 24, inner casing 25, vane 28, inner support 48, outer support 49, and combustor seal 50. Outer casing 24 and inner casing 25 are radially outward and inward, respectively, from combustor 16, thus creating annular plenum 29 around combustor 16. Vane 28 includes outer platform 54, inner platform 56, and airfoil 58 extending radially between inner platform 56 and outer platform 54. Combustor 16 includes combustor liner 30, bulkhead 32, bulkhead heat shield 34, fuel nozzle 36, swirler 38, and combustion chamber 40. Combustor liner 30 includes outer shell 42, inner shell 44, and a plurality of heat shields 46. Combustor 16 is an annular structure that extends circumferentially around engine center line $C_L$; thus combustor liner 30 is arcuate in shape, with an axis coincident with engine center line $C_L$. Although only one vane 28 is shown in FIG. 2, it is understood that the present invention encompasses embodiments including a plurality of vanes 28 as described above in reference to FIG. 1.

Combustor 16 is connected to inner casing 25 by inner support 48. Vane 28 is also connected to inner casing 25 by inner support 48 and is connected to outer casing 24 by outer support 49. Combustion chamber 40 within combustor 16 is bordered radially by combustor liner 30, by bulkhead 32 on an upstream axial end of combustion chamber 40, with a combustion gas opening on a downstream axial end of combustion chamber 40. Swirler 38 connects fuel nozzle 36 to bulkhead 32 through an opening in bulkhead 32. Bulkhead 32 is protected from the hot flow of combustion gases Fp generated within combustion chamber 40 by bulkhead heat shield 34. Heat shields 46 are attached to inner shell 44 to make up the inside diameter portion of combustor liner 30. Similarly, heat shields 46 are attached to outer shell 42 to make up the outside diameter portion of combustor liner 30. Heat shields 46 are attached to inner outer shell 42 and inner shell 44 by studs 52 projecting from heat shields 46. Combustor seal 50 seals between outer shell 42 at the downstream axial end of combustion chamber 40 and outer platform 54. Combustor seal 50 extends circumferentially around engine center line $C_L$ and may be made of the same material as outer shell 42, for example a high-temperature alloy such as a nickel based or cobalt based alloy. Combustor seal 50 may be a single ring-shaped piece or may be made up of multiple arcuate pieces that together form a ring extending circumferentially around engine center line $C_L$.

In operation, fuel from fuel nozzle 36 mixes with air in swirler 38 and is ignited in combustion chamber 40 to produce the flow of combustion gases Fp for use by turbine 18 as described above in reference to FIG. 1. Combustor liner 30 is cooled by the flow of cooling air Fc flowing from plenum 29 through openings (not shown) in outer shell 42, inner shell 44, and heat shields 46. Leakage of the flow of cooling air Fc between the outer shell 42 and outer platform 54 into the flow of combustion gases Fp is inhibited by combustor seal 50.

Figure 3A:
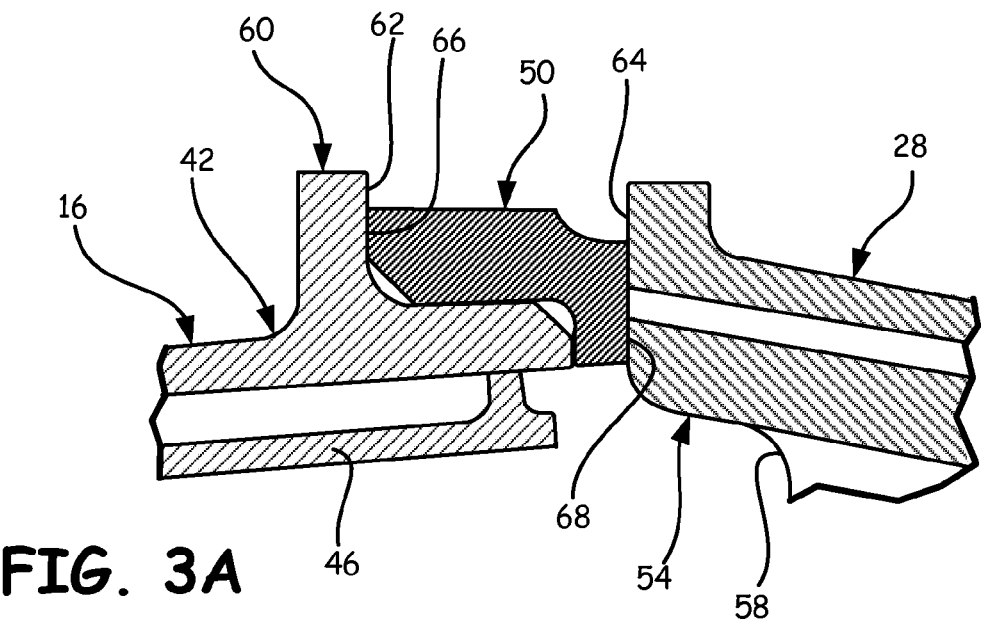
FIGS. 3A and 3B are further enlarged sectional views of the portion of the gas turbine engine shown in FIG. 2 illustrating axial loading of a combustor seal.
Figure 3B:
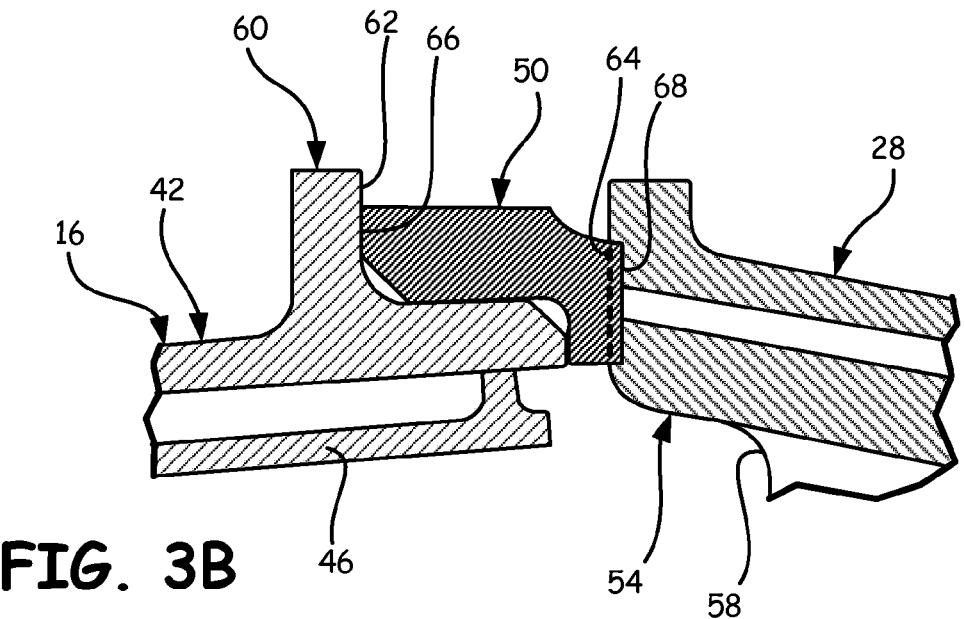

FIGS. 3A and 3B are enlarged sectional views of a portion of the gas turbine engine shown in FIG. 2. FIG. 3A illustrates combustor seal 50 under axial load between combustor 16 and vane 28. FIG. 3B illustrates that in a free state, combustor seal 50 and outer platform 54 would interfere with each other. It is this interference fit that leads to the axial load of FIG. 3A. The degree of interference shown is illustrative only and not to scale. In some embodiments, the degree of interference is at least enough to insure an assembled interference fit between combustor seal 50 and outer platform 54 over an expected range of manufacturing and assembly tolerances.

As shown in FIGS. 3A and 3B, outer shell 42 further includes flange 60 near the downstream axial end of outer shell 42. Flange 60 extends substantially radially outward from outer shell 42 and includes flange surface 62. Flange surface 62 faces substantially in the downstream axial direction. Outer platform 54 includes platform surface 64. Platform surface 64 faces substantially in the upstream axial direction, opposite flange surface 62. Combustor seal 50 includes upstream surface 66 and downstream surface 68. Upstream surface 66 and downstream surface 68 are substantially parallel to each other. Upstream surface 66 faces substantially upstream and downstream surface 68 faces substantially downstream. Upstream surface 66 is in contact with flange surface 62 and downstream surface 68 is in contact with platform surface 64.

Considering FIGS. 2, 3A, and 3B, together, inner casing 25, inner support 48, combustor 16, outer casing 24, and vane 28 are assembled to provide an axial load on combustor seal 50. During assembly, at least one of the inner casing 25, inner support 48, combustor 16, outer casing 24, or vane 28 undergoes elastic deformation as a result of the interference fit to provide the axial load on combustor seal 50. The axial load forces upstream surface 66 against flange surface 62 and forces downstream surface 68 against platform surface 64. The force provided by the axial load is sufficient to hold combustor seal 50 in position and create a seal between combustor seal 50 and a seal between outer shell 42 and between combustor seal 50 and outer platform 54.

The axial load produced by the assembly of the inner casing 25, inner support 48, combustor 16, outer casing 24, and vane 28 is separate from other forces which may contribute to overall axial load under various operating conditions. Such forces may include aerodynamic pressure on the combustor or thermal expansion effects. However, these forces may vary over the operating conditions of the gas turbine engine. The axial load is sufficient to ensure seal integrity under desired operating conditions without exceeding the yield strength of the inner casing 25, inner support 48, combustor 16, combustor seal 50, outer casing 24, or vane 28.

Embodiments of the present invention improve the efficiency of a gas turbine engine by axially loading the combustor seal. The axially loaded combustor seal effectively reduces the amount of compressed air leaking into the flow of combustion gases. The axial load urges sealing surfaces of the combustor seal, combustor, and vane together without a need for springs or other mechanisms which may fail. Additional retention devices are also eliminated as the axial load holds the combustor seal in position. Eliminating such devices improves the reliability of the combustor seal and simplifies assembly and maintenance of the gas turbine engine.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

A system for providing a seal between a combustor and a turbine vane includes a flange configured to extend radially from the combustor, and a seal. The flange includes a flange surface configured to face in an axial direction toward a surface of the vane. The seal is configured to be axially loaded between the flange surface and the surface of the vane.

The system of the preceding paragraph can optionally include, additionally and/or alternatively, any one or more of the following features, configurations and/or additional components:

the vane includes an outer platform and the surface of the vane is a surface of the outer platform;

the flange is integrally formed with, and extends radially outward from, the combustor;

the combustor seal is held against the flange surface and against the surface of the vane solely by an axial load;

the combustor seal is a single, ring-shaped piece;

the combustor seal includes a plurality of arcuate pieces forming a ring when held against the flange surface and against the surface of the vane by the axial load; and the combustor seal is made of a high-temperature alloy based on at least one of nickel and cobalt.

A gas turbine engine includes a combustor, a turbine vane downstream of the combustor, and a combustor seal. The combustor includes a radially extended flange near a downstream end of the combustor. The flange includes a flange surface facing in a downstream axial direction. The turbine vane includes a vane surface facing in an upstream axial direction opposite the flange surface. The combustor seal is axially loaded against the flange surface and the vane surface to seal a gap defined between the combustor and the turbine vane.

The engine of the preceding paragraph can optionally include, additionally and/or alternatively, any one or more of the following features, configurations and/or additional components:

the turbine vane includes an outer platform and the vane surface is a surface of the outer platform;

the engine further includes an outer casing radially outward from the combustor, an inner casing radially inward from the combustor, an inner support connecting the combustor to the inner casing, and an outer support connecting the turbine vane to the outer casing in which elastic deformation of at least one of the inner casing, the inner support, the outer casing, the outer support, the combustor, and the turbine vane provides an axial load on the combustor seal;

the axial load does not exceed the yield strength of the inner casing, the inner support, the outer casing, the outer support, the combustor, and the turbine vane;

the flange extends radially outward from the combustor;

the combustor seal is held against the flange surface and against the vane surface solely by an axial load;

the combustor seal is a single, ring-shaped piece;

the combustor seal includes a plurality of arc-shaped pieces forming a ring extending circumferentially around a center line of the engine when held against the flange surface and against the vane surface by an axial load; and the combustor seal is made of a high-temperature alloy based on at least one of nickel and cobalt.

A method of sealing between an annular combustor and a turbine vane includes positioning a combustor seal between a flange surface of the combustor and a vane surface of the turbine vane, and assembling an outer casing radially outward from the combustor, an inner casing radially inward from the combustor, an inner support connecting the combustor to the inner casing, and an outer support connecting the turbine vane to the outer casing with the combustor seal to provide axial loading on the combustor seal.

The method of the preceding paragraph can optionally include, additionally and/or alternatively, any one or more of the following features, configurations and/or additional components:

the combustor seal is secured against the flange surface and the vane surface solely by axial loading; and assembling includes elastically deforming at least one of the inner casing, the inner support, the outer casing, the outer support, the combustor, and the turbine vane to provide axial loading on the combustor seal.

The invention claimed is:

1. A system for providing a seal between a combustor and a turbine vane, the system comprising:
    an airfoil extending between an inner platform and an outer platform of the turbine vane, the outer platform including a platform surface on an axially forward side of the outer platform;
    a flange extending radially outward from the combustor, the flange including a flange surface on an axially aft side of the flange, wherein the flange surface is configured to face toward the platform surface of the vane; and
    a combustor seal with a body including an axially forward end and an axially aft end, wherein the body includes a radially inward projection adjacent the axially aft end, and
    wherein the combustor seal is configured to be axially loaded between the flange surface of the flange and the platform surface of the vane.

2. The system of claim 1, wherein the flange is integrally formed with the combustor.

3. The system of claim 1, wherein the combustor seal is held against the flange surface and against the platform surface of the vane solely by an axial load.

4. The system of claim 1, wherein the combustor seal is a single, ring-shaped piece.

5. The system of claim 1, wherein the combustor seal includes a plurality of arcuate pieces forming a ring when held against the flange surface of the flange and against the platform surface of the vane by the axial load.

6. The system of claim 1, wherein the combustor seal is made of a high-temperature alloy based on at least one of nickel and cobalt.

7. The system of claim 1, wherein the combustor seal includes an upstream surface on the axially forward end of the combustor seal, wherein the upstream surface of the combustor seal abuts the flange surface of the flange.

8. The system of claim 1, wherein the combustor seal includes a downstream surface on the axially aft end of the combustor seal, wherein the downstream surface of the combustor seal abuts the platform surface of the outer platform.

9. A gas turbine engine comprising:
 a combustor including:
  a radially extended flange near a downstream end of the combustor, the flange including a flange surface facing in a downstream axial direction;
 a turbine vane downstream of the combustor, the turbine vane including an airfoil extending between an inner platform and an outer platform, wherein the outer platform includes a vane surface facing in an upstream axial direction opposite the flange surface; and
 a combustor seal with a body including an axially forward end and an axially aft end, wherein the body includes a radially inward projection adjacent the axially aft end, and
 wherein the combustor seal is axially loaded against the flange surface of the flange and the vane surface of the outer platform to seal a gap defined between the combustor and the turbine vane.

10. The engine of claim 9, wherein the engine further comprises:
 an outer casing radially outward from the combustor;
 an inner casing radially inward from the combustor;
 an inner support connecting the combustor to the inner casing; and
 an outer support connecting the turbine vane to the outer casing;
 wherein elastic deformation of at least one of the inner casing, the inner support, the outer casing, the outer support, the combustor, and the turbine vane provides an axial load on the combustor seal.

11. The engine of claim 10, wherein the axial load does not exceed the yield strength of the inner casing, the inner support, the outer casing, the outer support, the combustor, and the turbine vane.

12. The engine of claim 9, wherein the flange extends radially outward from the combustor.

13. The engine of claim 9, wherein the combustor seal is held against the flange surface and against the vane surface solely by an axial load.

14. The engine of claim 9, wherein the combustor seal is a single, ring-shaped piece.

15. The engine of claim 9, wherein the combustor seal includes a plurality of arc-shaped pieces forming a ring extending circumferentially around a center line of the engine when held against the flange surface and against the vane surface by an axial load.

16. The engine of claim 9, wherein the combustor seal is made of a high-temperature alloy based on at least one of nickel and cobalt.

17. A method of sealing between an annular combustor and a turbine vane, the method comprising:
 positioning a combustor seal between a flange surface of the annular combustor and a vane surface of the turbine vane, wherein the combustor seal includes a body with an axially forward end and an axially aft end, and wherein the body includes a radially inward projection adjacent the axially aft end; and
 assembling an outer casing radially outward from the annular combustor, an inner casing radially inward from the combustor, an inner support connecting the combustor to the inner casing, and an outer support connecting the turbine vane to the outer casing with the combustor seal to provide axial loading on the combustor seal.

18. The method of claim 17, wherein the combustor seal is secured against the flange surface and the vane surface solely by axial loading.

* * * * *